(12) United States Patent
Leone et al.

(10) Patent No.: US 8,008,537 B2
(45) Date of Patent: Aug. 30, 2011

(54) METHOD FOR ELIMINATING POLLUTANTS CONTAINED IN AN ELASTIC PART

(75) Inventors: Patrice Leone, Acquigny (FR); Carole Pollini, Le Mesnil Esnard (FR)

(73) Assignee: Valois SaS, Le Neubourg (FR)

( * ) Notice: Subject to any disclaimer, the term of this patent is extended or adjusted under 35 U.S.C. 154(b) by 1076 days.

(21) Appl. No.: 10/584,154

(22) PCT Filed: Dec. 23, 2004

(86) PCT No.: PCT/FR2004/050753
§ 371 (c)(1),
(2), (4) Date: May 14, 2007

(87) PCT Pub. No.: WO2005/063863
PCT Pub. Date: Jul. 14, 2005

(65) Prior Publication Data
US 2008/0045772 A1    Feb. 21, 2008

(30) Foreign Application Priority Data
Dec. 23, 2003 (FR) .................................. 03 15294

(51) Int. Cl.
*A62D 3/36* (2007.01)

(52) U.S. Cl. ........................................ 588/318; 588/405
(58) Field of Classification Search ................ 588/313, 588/318, 405, 410
See application file for complete search history.

(56) References Cited

U.S. PATENT DOCUMENTS
4,381,392 A * 4/1983 Pontoglio ..................... 528/493

FOREIGN PATENT DOCUMENTS
| DE | 42 05 765 A1 | 8/1993 |
| GB | 594 871 A | 11/1947 |
| GB | 2 314 336 A | 12/1997 |
| WO | WO 93/12161 A1 | 6/1993 |

OTHER PUBLICATIONS

Database WPI Section CH, Week 197009 Derwent Publications Ltd., London, GB; AN 1970-14350R, XP002288570 & SU 243 948 A (S V Lebedev Synth Rubber), 1970.

* cited by examiner

*Primary Examiner* — Edward M Johnson
(74) *Attorney, Agent, or Firm* — Sughrue Mion, PLLC

(57) ABSTRACT

A method of eliminating pollutants contained in an elastomer part, the method including a step of extracting pollutants by immersing the part in a solvent, the solvent being ethanol.

8 Claims, 2 Drawing Sheets

METHOD FOR ELIMINATING POLLUTANTS CONTAINED IN AN ELASTIC PART

The present invention relates to a method of eliminating the pollutants contained in an elastomer part. The method is suitable for any type of elastomer material, but is preferably applied to the sealing gaskets provided in pumps.

It is well known that the polymerization of elastomers allows low molecular weight and generally toxic monomers and polymers to exist within the elastomer. Furthermore, for elastomers, curing agents are used based on sulfur or peroxide, and other additives are also used that produce residues within the elastomer. Just like the above-mentioned low molecular weight monomers and polymers, the residues are also of low molecular weight relative to the polymers constituting the elastomer.

When parts made of elastomer are intended to come into contact with certain pharmaceutical substances that are fragile, or that must remain very pure, it is known to extract the pollutants, in particular the pollutants of low molecular weight, before using the parts made of elastomer, so as to avoid the pollutants mixing with the pharmaceutical substance.

In particular, that method is used for gaskets made of elastomer that are intended for aerosol valves. Hexafluoroacetone (HFA) propellant gases, sometimes associated with ethanol, can be good solvents. They therefore risk dissolving the pollutants contained in the elastomer gaskets, and mixing them with pharmaceutical substances that are themselves also dissolved or in suspension in said propellant gas.

In the past, the substances used to extract the pollutants before the gaskets were used were chlorofluorocarbons CFCs (in particular Freon 11) that give satisfactory results, but that have a damaging effect on the ozone layer of the atmosphere, such that they had to be abandoned for environmental reasons.

SUMMARY

An object of the present invention is to remedy the above-mentioned drawbacks by means of a solution for substituting CFCs that guarantees satisfactory elimination of the pollutants contained in elastomer materials, in particular those of low molecular weight.

Another object of the present invention is to provide a method of eliminating pollutants contained in an elastomer part that is not intended to come into contact with a propellant gas.

Another object of the present invention is to provide a method of eliminating pollutants contained in an elastomer part, that is simple and inexpensive to implement, and that can easily adapted as a function of the material to be treated.

The present invention thus provides a method of eliminating pollutants contained in an elastomer part, said method comprising a step of extracting pollutants by immersing the part in a solvent, said solvent being ethanol.

Advantageously, said extraction step is performed in an extraction column in which the ethanol flows.

Advantageously, said extraction step is performed at a temperature lying in the range 20° C. to 75° C., and preferably in the range 25° C. to 70° C.

Advantageously, said extraction step is conducted over a duration lying in the range 1 hour (h) to 72 h, and preferably in the range 2 h to 48 h.

Advantageously, said pollutants are pollutants of low molecular weight.

Advantageously, said pollutants are pollutants of high molecular weight.

Advantageously, said elastomer part is a pump gasket.

Advantageously, the ethanol is renewed continuously during the pollutant extraction step.

BRIEF DESCRIPTION OF THE DRAWINGS

The above and other aspects of the invention will become apparent by describing in detail embodiments thereof with reference to the attached drawings in which.

DETAILED DESCRIPTION

The extraction method of the invention consists in immersing the elastomer parts in ethanol over a given length of time and at a given temperature. The purpose of the immersion is to eliminate a maximum amount of pollutants. In particular, the invention makes it possible to eliminate pollutants of low molecular weight, also known as extractables, without affecting the properties of the treated elastomer parts. Heavy pollutants, having high molecular weight, can also be eliminated effectively by the method of the invention. The invention is mainly intended for applying this treatment to gaskets that do not come into contact with propellant gases, such as pump gaskets. Although this type of treatment has been used in the prior art for valve gaskets functioning with propellant gases, in particular HFA gases, it has never been envisaged to apply it to pump gaskets, said pump gaskets not being considered as being likely to spoil the fluids that come into contact therewith. However, the present invention surprisingly makes it possible to improve pump gaskets considerably, by reducing the potentially damaging interaction between the treated gaskets and the fluids that come into contact therewith. The invention applies in particular to elastomers, but also to non-vulcanized materials, such as non-vulcanized rubber, subsequently making it possible to make pump gaskets.

A particular advantage of the invention is to renew the ethanol continuously during extraction, thereby making it possible to improve extraction and reduce the cycle time of the method. This makes the method more effective and less costly.

Figure 1:
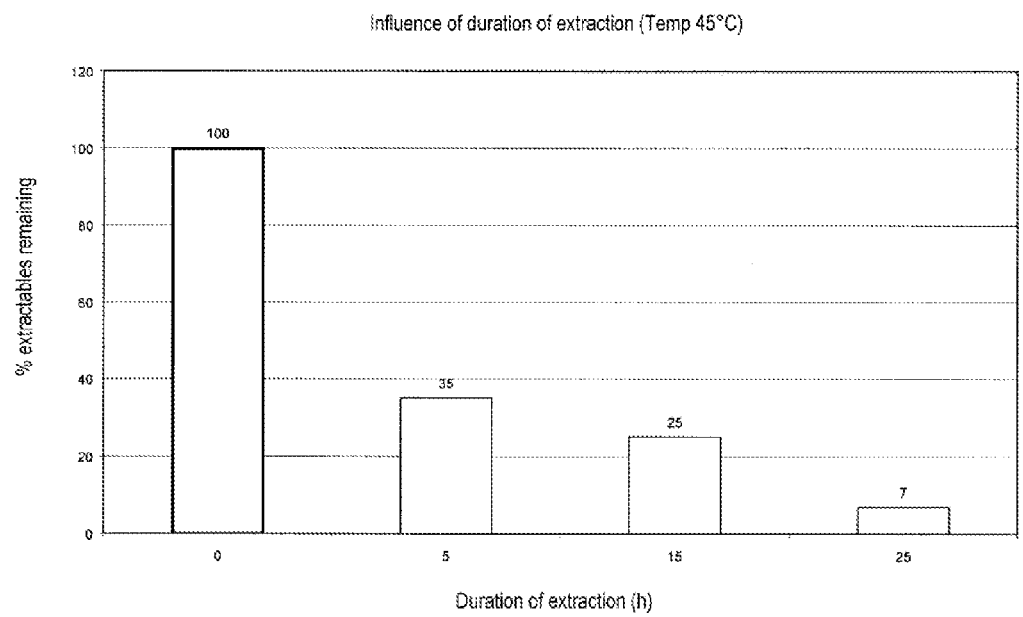
FIG. 1 shows the percentage of extractables remaining on a nitrile rubber gasket as a function of the extraction time.
Figure 2:
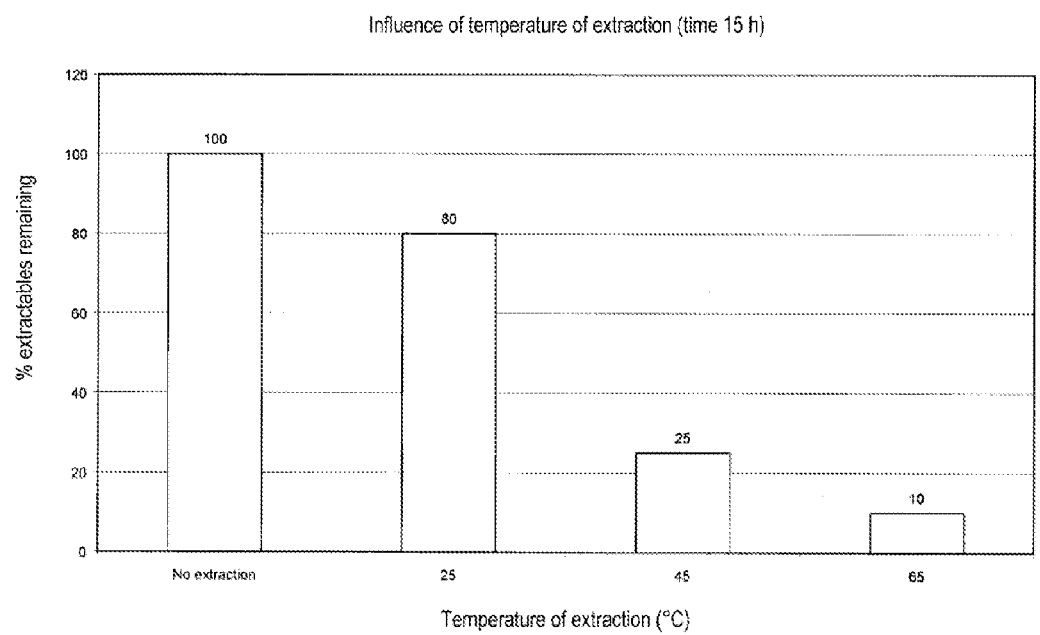
FIG. 2 shows the percentage of extractables remaining on a nitrile rubber gasket as a function of extraction temperature.
Figure 3:
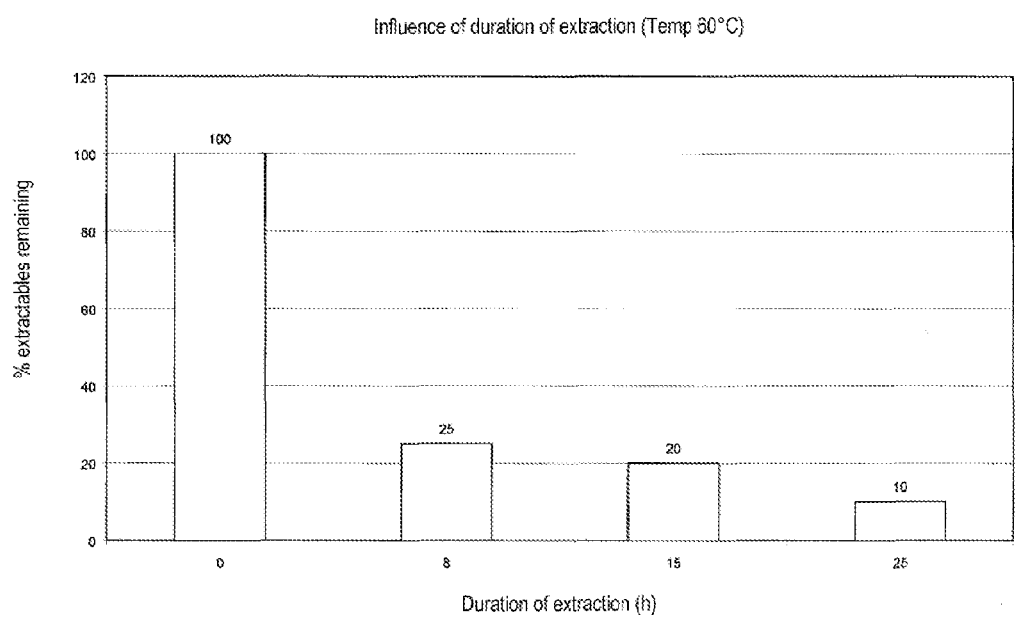
FIG. 3 shows the percentage of extractables remaining on an ethylene propylene diene monomer (EPDM) gasket as a function of the duration of extraction

Various experimental results are provided in FIGS. 1, 2, and 3.

FIG. 1 shows the percentage of extractables remaining on a nitrile rubber gasket as a function of the extraction time.

FIG. 1 shows that putting a nitrile rubber gasket into contact with ethanol, at a given temperature of 45° C. for example, presents an extremely advantageous effect on the extraction level of the pollutants contained in the gasket. After being immersed for 5 h in ethanol, a high reduction in the quantity of extractables contained in the gasket is observed, with the percentage of extractables remaining falling to 35%. Then, the experimental measurements reveal a steady reduction in the percentage of extractables remaining, passing to 25% of extractables remaining after 15 h, and to 7% of extractables remaining after 25 h.

FIG. 2 shows the percentage of extractables remaining on a nitrile rubber gasket as a function of extraction temperature.

FIG. 2 shows the influence of temperature in the step of extracting, in ethanol, pollutants contained in a nitrile rubber gasket. By placing the nitrile rubber gasket in ethanol for 15 h at different temperatures, it can be seen that the percentage of extractables remaining varies as a function of the applied temperature. The experimental results show that the higher the temperature of the extraction reaction, the lower the percentage of extractables remaining in the gasket. Thus, immersing the gasket in ethanol for 15 h at 25° C., causes 20% of the extractables to be eliminated, i.e. a percentage of extractables remaining of 80%, while the percentages of extractables remaining at 45° C. and at 75° C. reach 25% and 10% respectively.

FIG. 3 shows the percentage of extractables remaining on an ethylene propylene diene monomer (EPDM) gasket as a function of the duration of extraction.

FIG. 3 shows the influence of the duration of extraction on the level of extractables remaining in an EPDM gasket. In identical manner to FIG. 1, FIG. 3 shows a drop in the percentage of extractables remaining, with increasing duration of immersion in ethanol of the EPDM gasket. Thus, immersion at 60° C. for 8 h results in the percentage of pollutants eliminated rising to 75%, i.e. only 25% of pollutants remaining in the gasket, the percentage of extractables remaining falling to 20% and to 10% after 15 h and 25 h respectively.

It should be noted that the duration and the temperature of extraction can be established by taking account of various criteria, in particular the final level of extractables remaining in the gasket, and the type of elastomer material to be treated. Thus, some materials, such as nitrile rubber, are more sensitive to extraction in ethanol, and conditions that are too severe (long duration, high temperature) are thus likely to affect the properties of the gasket, such as its mechanical properties.

The present invention is described above with reference to particular embodiments, but any useful modifications could be made by the person skilled in the art, without going beyond the ambit of the present invention, as defined by the accompanying claims.

The invention claimed is:

1. A method of eliminating pollutants contained in an elastomer pump gasket, said method being characterized in that it comprises a step of extracting pollutants by immersing the pump gasket in a solvent, said solvent being ethanol.

2. A method according to claim 1, in which said extraction step is performed in an extraction column in which the ethanol flows.

3. A method according to claim 1, in which said extraction step is performed at a temperature lying in the range 20° C. to 75° C., and preferably in the range 25° C. to 70° C.

4. A method according to claim 1, in which said extraction step is conducted over a duration lying in the range 1 h to 72 h, and preferably in the range 2 h to 48 h.

5. A method according to claim 1, in which said pollutants are pollutants of low molecular weight.

6. A method according to claim 1, in which said pollutants are pollutants of high molecular weight.

7. A method according to claim 1, in which the ethanol is renewed continuously during the pollutant extraction step.

8. A method according to claim 1, wherein the pump gasket is formed as a solid one-piece construction.

* * * * *